United States Patent [19]
Le Blanc et al.

[11] Patent Number: 5,531,923
[45] Date of Patent: Jul. 2, 1996

[54] TWIN-SCREW EXTRUSION OF SILICONE DOUGHS SUITED FOR SIH/SIVI RTV COMPOSITIONS

[75] Inventors: Loic Le Blanc, Oullins; Rene Pagliari, Marennes, both of France

[73] Assignee: Rhone-Poulenc Chimie, Courbevoie, France

[21] Appl. No.: 237,997

[22] Filed: May 4, 1994

Related U.S. Application Data

[63] Continuation of Ser. No. 714,829, Jun. 13, 1991, abandoned.

[30] Foreign Application Priority Data

Jun. 13, 1990 [FR] France .................. 90 07609

[51] Int. Cl.$^6$ ........................... C09K 3/00
[52] U.S. Cl. .............. 252/182.14; 524/860; 264/211.23
[58] Field of Search ............... 252/182.14; 524/860; 264/211.23

[56] References Cited

U.S. PATENT DOCUMENTS

| | | | |
|---|---|---|---|
| 3,960,802 | 6/1976 | Beers et al. | 524/857 |
| 4,116,919 | 9/1978 | Elias et al. | 524/847 |
| 4,340,709 | 7/1982 | Jeram et al. | 528/15 |
| 4,344,800 | 8/1982 | Lutz | 524/860 |
| 4,418,165 | 11/1983 | Polmanteer et al. | 523/210 |
| 4,446,090 | 5/1984 | Lougren et al. | 264/211 |
| 4,469,522 | 9/1984 | Matsumoto | 524/588 |
| 4,513,115 | 4/1985 | Beers | 524/731 |
| 4,528,324 | 7/1985 | Chung et al. | 524/863 |
| 4,548,999 | 10/1985 | Steinberger et al. | 525/453 |
| 4,585,830 | 4/1986 | Sweet | 524/862 |
| 4,649,005 | 3/1987 | Kobayashi et al. | 524/860 |
| 4,696,970 | 9/1987 | Sumimura et al. | 524/860 |
| 4,711,928 | 12/1987 | Lee et al. | 524/860 |
| 4,980,413 | 12/1990 | Kasuya | 524/730 |
| 5,081,172 | 1/1992 | Chaffee et al. | 524/188 |
| 5,213,899 | 5/1993 | Lucas | 524/860 |
| 5,227,111 | 7/1993 | Brangers et al. | 524/860 |

FOREIGN PATENT DOCUMENTS

| | | |
|---|---|---|
| 0172678 | 2/1986 | European Pat. Off. |
| 0305032 | 3/1989 | European Pat. Off. |

*Primary Examiner*—Edward A. Miller
*Attorney, Agent, or Firm*—Burns, Doane, Swecker & Mathis

[57] ABSTRACT

Silicone doughs suitable for incorporation into diorganopolysiloxane compositions crosslinkable into elastomeric state are rapidly and conveniently formulated by continuously and simultaneously individually introducing along the longitudinal axis of a twin-screw extruder, via a plurality of longitudinally spaced discrete inlet entries, and twin-screw extruding (a) a polydiorganosiloxane oil having a viscosity at 25° C. of less than 500,000 mPa.s and containing at least two $\equiv$Si–CH=CH$_2$ functional groups per molecule, (b) water, (c) silica, and (d) a polysilazane which is liquid under normal conditions of temperature and pressure.

28 Claims, No Drawings

TWIN-SCREW EXTRUSION OF SILICONE DOUGHS SUITED FOR SIH/SIVI RTV COMPOSITIONS

This application is a continuation of application Ser. No. 07/714,829, filed Jun. 13, 1991, and now abandoned.

BACKGROUND OF THE INVENTION

1. Field of the Invention

The present invention relates to the preparation of a dough adopted for incorporation into compositions which are vulcanizable into elastomeric state by a polyaddition reaction, namely, by a crosslinking reaction between a polydiorganosiloxane containing at least two $\equiv$Si–CH=CH$_2$ groups (abbreviated SiVi groups) in its molecule and a polysiloxane containing at least two $\equiv$SiH groups in its molecule. Once vulcanized (crosslinked), these compositions form silicone elastomers and such compositions are vulcanizable at room temperature or at higher temperatures (generally lower than 200° C.).

2. Description of the Prior Art

Compositions of the above general type are known to this art, and are typically two-pack (two-component) compositions, i.e., they are marketed in two packages, the contents of which must be mixed at the time of use. The preferred catalyst employed for crosslinking these compositions is in most cases a complex compound of platinum such as, for example, that prepared from chloroplatinic acid and 1,3-divinyl-1,1,3,3-tetra-methyldisiloxane, according to U.S. Pat. No. 3,814,730. Other platinum complexes are described in U.S. Pat. Nos. 3,159,601, 3,159,662 and 3,220,972.

In such two-pack compositions, one of the packs contains, for example, a dough (based on polysiloxane containing SiVi functional groups and silica) to which at least one polysiloxane containing an SiH functional group has been added with stirring; part A is thus provided. The other pack (part B) contains the catalyst for the polyaddition reaction, for example in addition to the dough described above.

Such compositions can also be presented in a single pack (in which case they are designated single-component compositions) and they then contain, in known manner in the same pack, the components of the above parts A+B and an inhibitor of platinum, such as those described, for example, in U.S. Pat. Nos. 3,445,420 (acetylenic alcohols) and 4,061,609 (hydroperoxides), which ensures that the compositions do not vulcanize until they are removed from the package (in air) or after they have been slightly heated.

In the prior art techniques for formulating the compositions described above, a dough is generally first prepared, in a trough kneader, from the polysiloxane containing an SiVi group, silica, water and hexamethyldisilazane, and the mixture must be kneaded for a number of hours (at least three hours).

SUMMARY OF THE INVENTION

Accordingly, a major object of the present invention is the provision of an improved technique for the processing of polydiorganosiloxane doughs that is far more rapid than the prior art operations, characteristically being carried out in less than 15 minutes, advantageously in a period of time ranging from 20 second to 10 minutes, preferably from 30 seconds to 5 minutes.

Another object of the present invention is the provision of an improved technique for the processing of such doughs that permits reduced amounts of the hexamethyldisilazane to be used, compared with the noncontinuous (batch) processes of the prior art.

Yet another object of this invention is the provision of an improved technique for the processing of such doughs to ultimately produce elastomers exhibiting a high tear resistance, Rt, (higher than 25 kN/m) from a dough which has a viscosity of less than 50,000 mPa.s, which dough is storage stable for six months at room temperature, and its viscosity does not exceed 80,000 mPa.s. To produce elastomers which have Rt values higher than 20 kN/m utilizing the (batchwise) processes of the prior art, it is necessary to prepare doughs which have viscosities well above 50,000 mPa.s. When they are stored (6 months at room temperature), these doughs (obtained batchwise) and the corresponding parts A undergo a change which results in their having very high viscosities, for example on the order of 100,000 mPa.s in the case of part A, and higher than 500,000 mPa.s in the case of the dough itself.

Briefly, the present invention features a process for the preparation of a dough adopted for incorporation into compositions which can be vulcanized by polyaddition reaction to produce silicone elastomers, comprising continuously and simultaneously injecting into a twin-screw extruder, into at least four different inlets thereof:

(a) a polydiorganosiloxane oil having a viscosity at 25° C. of less than 500,000 mPa.s, advantageously less than 250,000 mPa.s, and containing at least two $\equiv$Si–CH=CH$_2$ groups per molecule, (b) water, (c) silica, and (d) a polysilazane which is liquid under normal conditions of temperature and pressure.

DETAILED DESCRIPTION OF THE PREFERRED EMBODIMENTS OF THE INVENTION

More particularly according to the present invention, the twin-screw extruder employed for the preparation of the dough is a device containing two screws which are arranged alongside each other and whose lengthwise axes are parallel. These two screws preferably rotate together and scrape each other, namely, these two screws rotate in the same direction. In an alternate embodiment, the lengthwise axes of the screws may be convergent and in this event the screws must necessarily be counterrotating. The above twin-screw extruders are well known to this art; exemplary thereof are the Werner and Pfleiderer ZSK and Continua extruders and their derivative Kompiplast KP, the Baker-Perkins machine MPC/V, the Leitstritz machines, the Berstorff ZE . . . A machine, and the Clextral twin-screw extruder. These extruders are generally modular machines, both in respect of the barrels (parts of the apparatus enveloping the screws) as well as the screws. In other words, the user himself designs the extruder from the screw and barrel components individually marketed by the manufacturers thereof.

To carry out dough preparation process of the present invention, the twin-screw extruder advantageously has an L/D ratio ranging from 20 to 45, preferably from 25 to 35, with L denoting the length of each screw and D their diameter, both expressed in the same units. Furthermore, the circumferential velocity of the extruder screws advantageously ranges from 0.2 to 1.2 m/s (meters per second), preferably from 0.6 to 1 m/s.

The polydiorganosiloxane oil (a) for the preparation of the dough according to the present invention contains at least two $\equiv$Si–CH=CH$_2$ groups per molecule. Its viscosity is generally less than 500,000 mPa.s at 26° C., advantageously less than 250,000 mPa.s, and preferably ranges from 100 to 50,000 mPa.s. This oil essentially consists of R$_2$SiO units, the symbols R, which may be identical or different, especially representing optionally halogenated C$_1$–C$_4$ cycloaklyl groups or optionally substituted or halogenated C$_5$–C$_6$ aryl groups.

The following are exemplary thereof:
(i) alkyl groups, especially the methyl, ethyl, propyl and butyl radicals,
(ii) halogenated alkyl groups, e.g., 3,3,3-trifluoropropyl radicals,
(iii) cycloalkyl groups, e.g., cyclohexyl radicals,
(iv) aryl groups, e.g., phenyl radicals.

At least 85% of the groups R are preferably methyl radicals.

The silica employed in the process according to the present invention is a reinforcing silica whose specific surface area is greater than 40 m$^2$/g, typically ranging from 50 to 400 m$^2$/g. Such silicas may be precipitated silicas, but pyrogenic silicas are employed more advantageously.

The polysilazane employed in the process according to the present invention is a material which is liquid at normal temperature and pressure conditions, namely, at a temperature of 23° C. and a pressure of 760 mm of mercury. This polysilazane has the general formula:

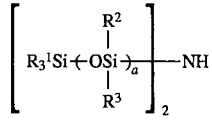

in which R$^1$, R$^2$ and R$^3$, which may be identical or different, are each a C$_1$–C$_4$ monovalent hydrocarbon radical and a is an integer ranging from 0 to 50, inclusive. This polysilazane is advantageously a disilazane in which a=0 and is selected, for example, from among divinyltetramethyldisilazane or preferably hexamethyldisilazane, designated HMDZ in the description which follows.

To carry out the process for the preparation of a dough according to the present invention, the following are injected continuously and simultaneously into the twin-screw extruder:

the polydiorganosiloxane oil (a),
the water (b),
the silica (c), and
the polysilazane (d), into at least four different zones along the extruder, the oil (a) being introduced into the extruder via an inlet which is the most distant from the point where the resulting dough exits the extruder. Stated differently, the oil (a) is injected/introduced into the extruder at the most upstream inlet, whereas the polysilazane is introduced into the extruder via an inlet which is furthest downstream in relation to the inlet point of the oil (a), of the water (b) and of the silica (c).

It has now unexpectedly been found that to produce a dough which has a viscosity of less than 50,000 mPa.s, which is markedly storage-stable over time and which enables formulation of compositions that are crosslinkable into elastomers which have good mechanical properties, especially a tear resistance higher than 25 kN/m, the polysilazane must be introduced into the extruder at two different points or inlets situated along the extruder. At the first point, designated HMDZ1, furthest upstream along the extruder and located distant from the points where the oil (a), the water (b) and the silica (c) have been introduced, 35% to 70% by weight of the total amount of polysilazane is continuously injected, the remaining amount of polysilazane being introduced into the extruder at a point HMDZ2, downstream of the point HMDZ1.

Furthermore, it has also been found that it is preferable that the screws should not include any "kneading" components between the points of introduction of the silica and the introduction HMDZ1 point of the polysilazane. Thus, between the points of introduction of the silica and HMDZ1, the screws do not include any components constituting a geometrical discontinuity such as to alter the filling ratio or to give rise to a high axial pressure gradient.

In the process according to the present invention, the following constituents are introduced into the twin-screw extruder per 100 parts by weight of the oil (a):

0.5 to 8 parts of water (b),
20 to 80 parts of silica (c),
3 to 20 parts of polysilazane (d).

The water may be injected into the twin-screw extruder at an independent injection inlet, or may optionally be injected via the same inlet as the oil (a) after the oil (a) and the water (b) have, or have not, been premixed.

The water may optionally be included in the silica.

The dough produced by the process according to the present invention is devolatilized in order to expel the water and the volatile components therefrom.

This devolatilization may be conducted just before the dough exits the twin-screw extruder or after it has been extruded from the extruder, for example by transporting it through another extruder or in a trough kneader.

Such devolatilization is carried out at a temperature which generally ranges from 50° to 200° C. When it is carried out in the extruder, the operation is conducted, for example, at an absolute pressure of 1 to 200 mm of mercury, whereas in a trough kneader the operation is conducted, for example, at atmospheric pressure under a stream of nitrogen.

To formulate a polyorganosiloxane composition to produce silicone elastomers, the following constituents are added to the dough, devolatilized beforehand, prepared by the process of the present invention:

(i) an organopolysiloxane containing at least two, preferably three, $\equiv$SiH groups per molecule,
(ii) a catalytically effective amount of a catalyst of a metal from the platinum group of the Periodic Table,
(iii) optionally, a diorganopolysiloxane oil endblocked by diorganovinylsiloxy groups, such as, for example, dimethylvinylsiloxy radicals, at each end of the polymer chain,
(iv) optionally a filler, such as, for example, ground quartz.

In order to further illustrate the present invention and the advantages thereof, the following specific examples are given, it being understood that same are intended only as illustrative and in nowise limitative.

In said examples to follow, Example 2 illustrates that the process according to the invention enables formulation of a dough which exhibits the smallest increase in viscosity after aging and from which elastomers are produced having the best tear resistances.

EXAMPLE 1

The process was carried out in a twin-screw extruder manufactured by Leistritz. The screws had a diameter of 34 mm and the L/D ratio was equal to 35, L denoting the working length of each screw, namely, the length in contact with which at least the oil (a), more fully described below, circulates. The screws rotated at 400 revolutions per minute and the extruder throughput was adjusted to 9.4 kg per hour.

The materials employed to produce the dough were introduced continuously and simultaneously into the extruder, in the following proportions by weight:

(a) 100 parts of an oil comprising recurring dimethylsiloxy structural units along its polymer chain which was blocked by a dimethylvinylsiloxy radical at each end of the polymer chain, having a viscosity of 600 mPa.s, the percentage by weight of vinyl groups being 0.4%, (b) 4 parts of water, (c) 43 parts of A300 silica, a pyrogenic silica marketed by Degussa, which had a specific surface area of 300 $m^2/g$, and (d) 8.6 parts of hexamethyldisilazane.

The oil (a) and the water (b) were injected into the extruder separately, but via the same inlet, at a point farthest upstream along the extruder, the silica (c) was introduced at a point downstream in relation to the point of introduction of the oil (a), and the hexamethyldisilazane was introduced downstream along the extruder in relation to the point where the silica was introduced, at only one point HMDZ1. The screws had no kneading component between the point of introduction of the silica and the point of introduction HMDZ1 of the hexamethyldisilazane. It should be clearly understood that the point where the dough exits the extruder corresponds to the downstream end of the extruder.

The average residence time of the mass in the extruder was 1 minute, 40 seconds.

The dough produced was devolatilized for 3 hours in a trough kneader at 150° C. at an absolute pressure of 100 mbar.

The following were added to 100 parts by weight of the devolatilized dough:

8.5 parts of a mixture of two polydimethylsiloxane oils, one having a viscosity of 50 mPa.s (representing 65% of the mixture) and the other 300 mPa.s, and containing, respectively, 2 gram-atoms/kg and 1.7 gram-atoms/kg of hydrogen forming moiety of SiH groups.

Part A was thus obtained.

Part B was prepared separately by adding to 100 parts by weight of the same dough:

(i) catalytic platinum in the form of an organometallic complex of the Lamoreaux type (according to U.S. Pat. No. 3,220,972) in a proportion of 80 mg of Pt per kg of part B, (ii) a platinum-complexing oil which serves as an inhibitor, such as divinyltetramethyldisiloxane.

The mixture of these two parts, in a proportion of 10 parts of B per 90 parts of A, crosslinked at room temperature. After 24 hours of crosslinking, the Shore A hardness (SAH) was measured according to ASTM standard D 2240 and the tear resistance (Rt) according to ASTM standard D 624 for the elastomers obtained.

These results and the viscosities of the dough after exiting the extruder and after aging are reported in the Table below.

EXAMPLE 2

The procedure of Example 1 was repeated, under the same conditions and with the same amounts of materials as those of Example 1, except that the hexamethyldisilazane was introduced into the twin-screw extruder via two separate inlets along the extruder, the point of introduction furthest upstream being designated HMDZ1 and the point of introduction downstream in relation to HMDZ1 being designated HMDZ2. In this example, 45.3% of the total amount of hexamethyldisilazane was introduced into the twin-screw extruder at the point HMDZ1.

The screws had no kneading component between the point of introduction of the silica and the point of introduction HMDZ1 of the hexamethyldisilazane.

The mechanical properties of the elastomers produced from the composition prepared as in Example 1 (but using the dough of the present Example 2) are also reported in the Table below.

EXAMPLE 3

The procedure of Example 2 was repeated, under the same conditions as those of Example 2, the only difference being that the screws include kneading components between the point of introduction of the silica and the point of introduction HMDZ1 of hexamethyldisilazane.

The mechanical properties of the elastomers produced from the composition prepared as in Example 2 (but using the dough of the present Example 3) are also reported in the Table below.

TABLE

|  | Example 1 | Example 2 | Example 3 |
|---|---|---|---|
| Hexamethyldisilazane introduced at HMDZ1 (parts by weight) | 8.6 | 3.9 | 3.9 |
| Hexamethyldisilazane introduced at HMDZ2 (parts by weight) | 0 | 4.7 | 4.7 |
| "Dough" initial viscosity (mPa.s) | 148,000 | 49,000 | 62,200 |
| "Dough" viscosity after aging 140 h/100° C. (mPa.s) | 198,000 | 82,000 | 85,000 |
| SAH | 26 | 26 | 26 |
| Rt (kN/m) | 30.3 | 27.6 | 21.4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the formulation of a dough component crosslinkable into elastomeric state when combined with a catalyst component, comprising continuously and simultaneously individually introducing along the longitudinal axis of a twin-screw extruder, via a plurality of longitudinally spaced discrete inlet entries, and twin-screw extruding (a) a polydiorganosiloxane oil having a viscosity at 25° C. of less than 500,000 mPa.s and containing at least two ≡Si—CH= $CH_2$ functional groups per molecule, (b) water, (c) silica, and (d) a polysilazane which is liquid at a temperature of 23° C. and a pressure of 760 mm of mercury, said oil (a) being introduced into a most upstream inlet and said polysilazane (d) being introduced via both an intermediate inlet and a most downstream inlet, the intermediate inlet being located downstream from the most upstream inlet, and the most downstream inlet being located downstream from the intermediate inlet.

2. The process as defined by claim 1, comprising introducing said constituents (a), (b), (c) and (d) into said twin-screw extruder via at least four discrete inlets.

3. The process as defined by claim 1, said polysilazane (d) comprising a disilazane.

4. The process as defined by claim 3, said disilazane comprising divinyltetramethyldisilazane or hexamethyldisilazane.

5. The process as defined by claim 1, said polysilazane (d) being introduced via two separate inlets, designated the intermediate inlet HMDZ1 and the downstream inlet HMDZ2, with 35% to 70% by weight thereof being introduced via the intermediate inlet HMZD1.

6. The process as defined by claim 1, wherein the average residence time of the oil (a) and silica (c) in the extruder ranges from 20 seconds to 10 minutes.

7. The process as defined by claim 6, said average residence time ranging from 30 seconds to 5 minutes.

8. The process as defined by claim 1, comprising introducing, per 100 parts by weight of said oil (a), from 0.5 to 8 parts by weight of water (b), from 20 to 80 parts by weight of silica (c) and from 3 to 20 parts by weight of polysilazane (d).

9. The process as defined by claim 1, said oil (a) having a viscosity ranging from 100 to 50,000 mPa.s.

10. The process as defined by claim 1, said silica (c) comprising a pyrogenic silica having a specific surface area greater than 40 m$^2$/g.

11. The process as defined by claim 1, said twin-screw extruder having an L/D ratio ranging from 20 to 45.

12. The process as defined by claim 11, said L/D ratio ranging from 25 to 35.

13. The process as defined by claim 1, wherein the circumferential velocity of the extruder screws ranges from 0.2 to 1.2 m/s.

14. The process as defined by claim 1, further comprising devolatilizing the dough thus produced.

15. The dough product of the process as defined by claim 1.

16. A process for the formulation of a dough suitable for incorporation into diorganopolysiloxane compositions crosslinkable into elastomeric state, comprising continuously and simultaneously individually introducing along the longitudinal axis of a twin-screw extruder, via a plurality of longitudinally spaced discrete inlet entries, and twin-screw extruding (a) a polydiorganosiloxane oil having a viscosity at 25° C. of less than 500,000 mPa.s and containing at least two ≡Si–CH=CH$_2$ functional groups per molecule, (b) water (c) silica, and (d) a polysilazane which is liquid at a temperature of 23° C. and a pressure of 760 mm of mercury, said oil (a) being introduced via a most upstream inlet and the polysilazane (d) via a most downstream inlet and a fraction of said polysilazane (d) being introduced via an intermediate inlet, designated the downstream inlet HMDZ2 and the intermediate inlet HMDZ1, with 35% to 70% by weight thereof being introduced via the intermediate inlet HMZD1, wherein no kneading is carried out between the point of inlet of the silica and HMDZ1.

17. A process for the formulation of a dough suitable for incorporation into diorganopolysiloxane compositions crosslinkable into elastomeric state, comprising continuously and simultaneously individually introducing along the longitudinal axis of a twin-screw extruder, via a plurality of longitudinally spaced discrete inlet entries, and twin-screw extruding (a) a polydiorganosiloxane oil having a viscosity at 25° C. of less than 500,000 mPa.s and containing at least two ≡Si–CH=CH$_2$ functional groups per molecule, (b) water, (c) silica, and (d) a polysilazane which is liquid at a temperature of 23° C. and a pressure of 760 mm of mercury, said oil (a) being introduced via a most upstream inlet and the polysilazane (d) via a most downstream inlet and a fraction of said polysilazane (d) being introduced via an intermediate inlet, designated the downstream inlet HMDZ2 and the intermediate inlet HMDZ1, with 35% to 70% by weight thereof being introduced via the intermediate inlet HMZD1, wherein kneading is carried out between the point of inlet of the silica and HMDZ1.

18. A process for the formulation of a dough, said process comprising:
continuously and simultaneously introducing into a twin-screw extruding machine:
(a) a polydiorganosiloxane oil having a viscosity at 25° C. of less than 250,000 mPa.s containing at least two ≡Si–CH=CH$_2$ functional groups per molecule;
(b) water;
(c) precipitation or combustion silica having a specific surface area of between 50 and 400 m$^2$/g; and
(d) a polysilazane in liquid form at 23° C. and 760 mm of mercury corresponding to the formula:

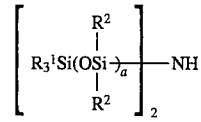

where R$^1$, R$^2$, and R$^3$ represent monovalent C$_1$ to C$_4$ hydrocarbonic groups, and a is a whole number between 0 and 50,
wherein said oil (a) is introduced into the extruding machine at a most upstream inlet and said polysilazane (d) is fed into the extruding machine at a point downstream of feed inlets for said oil (a), said water (b), and said precipitated or pyrogenic silica (c); said polysilazane (d) is fed into the extruding machine at a first point and a second point; the extruding machine screws comprising no mixing components between the silica-feed location and the first polysilazane-feed point; and an average retention time of the mass of constituents in the extruding machine being between 20 seconds and 10 minutes, thereby providing a dough having an initial viscosity of 50,000 mPa.s.

19. The process according to claim 18, wherein the polysilazane is a disilazane.

20. The process according to claim 19, wherein the disilazane is divinyltetramethyldisilazane or hexamethyldisilazane.

21. The process according to claim 18, wherein 35 to 70% by weight of the quantity of polysilazane is fed at said first feed point, and the remaining quantity of polysilazane is fed at said second feed point.

22. The process according to claim 18, wherein the average retention time of the mass of constituent in the extruding machine is between 30 seconds and 5 minutes.

23. The process according to claim 18, wherein for 100 parts oil by weight, 0.5 to 8 parts water, 20 to 80 parts silica, and 3 to 20 parts polysilazane are fed into the extruding machine.

24. The process according to claim 18, wherein said oil has a viscosity of between 100 and 50,000 mPa.s.

25. The process according to claim 18, wherein the extruding machine has an L/D ratio of between 20 and 45, L representing the length of each screw of the extruding machine and D the diameter thereof, expressed in the same unit.

26. The process according to claim 25, wherein the L/D ratio is between 25 and 35.

27. The process according to claim 18, wherein the screws of the extruding machine are operated at a circumferential speed of between 0.6 and 1 m/s.

28. The process according to claim 18, wherein the dough thus obtained is devolatilized.

* * * * *